(12) United States Patent
Tsai et al.

(10) Patent No.: US 11,630,575 B2
(45) Date of Patent: Apr. 18, 2023

(54) SYSTEM AND METHOD FOR A KEYPAD ON A TOUCH SCREEN DEVICE

(71) Applicant: Stripe, Inc., South San Francisco, CA (US)

(72) Inventors: Hwai Sian Tsai, Hong Kong (HK); Chi Wah Lo, Hong Kong (HK)

(73) Assignee: STRIPE, INC., South San Francisco, CA (US)

(*) Notice: Subject to any disclaimer, the term of this patent is extended or adjusted under 35 U.S.C. 154(b) by 15 days.

(21) Appl. No.: 17/177,311

(22) Filed: Feb. 17, 2021

(65) Prior Publication Data

US 2021/0165567 A1 Jun. 3, 2021

Related U.S. Application Data

(63) Continuation of application No. 16/166,353, filed on Oct. 22, 2018, now Pat. No. 10,936,189.
(Continued)

(51) Int. Cl.
*G06F 3/048* (2013.01)
*G06F 3/04886* (2022.01)
(Continued)

(52) U.S. Cl.
CPC ........ *G06F 3/04886* (2013.01); *G06F 3/0237* (2013.01); *G06F 3/0412* (2013.01); *G06F 21/36* (2013.01)

(58) Field of Classification Search
CPC .. G06F 3/04886; G06F 3/0219; G06F 3/0233; G06F 3/0238; G06F 1/1662;
(Continued)

(56) References Cited

U.S. PATENT DOCUMENTS

| 5,128,672 A | 7/1992 | Kaehler |
| 5,213,422 A * | 5/1993 | Garfinkle ................... B41J 5/10 400/477 |

(Continued)

FOREIGN PATENT DOCUMENTS

| CN | 201035502 | 3/2008 |
| CN | 102422302 A | 4/2012 |

(Continued)

OTHER PUBLICATIONS

Patent Cooperation Treaty: CN International Searching Authority; International Search Report and Written Opinion LIU, Ke; dated Jan. 30, 2019; 10 pages.

*Primary Examiner* — Steven B Theriault
(74) *Attorney, Agent, or Firm* — Womble Bond Dickinson (US) LLP

(57) ABSTRACT

What is disclosed is a system for randomization of one or more display parameters for a keypad displayed on a touch-screen of a mobile device, said system comprising a randomization subsystem to randomly select one or more variables related to at least one of said one or more display parameters, said one or more display parameters comprising a location of the keypad relative to said edge of said touchscreen; a size of said keypad; one or more sizes of one or more buttons within said keypad, and one or more positions of one or more groups of the one or more buttons within said keypad.

20 Claims, 14 Drawing Sheets

Related U.S. Application Data

(60) Provisional application No. 62/576,401, filed on Oct. 24, 2017.

(51) Int. Cl.
*G06F 3/023* (2006.01)
*G06F 3/041* (2006.01)
*G06F 21/36* (2013.01)

(58) Field of Classification Search
CPC ...... G06F 21/83; G06F 1/1673; G06F 3/0488; G06F 30/398; G06F 2119/18; G06F 2111/04; G06F 2111/06; G06F 2111/20; G06F 21/72; G06F 30/20; G06F 16/221; G06F 16/2255; G06F 16/24544; G06F 16/24554; G06F 16/2456; G06F 16/93; G06F 21/36; G06F 21/62; G06F 2212/657; G06F 30/00; G06F 30/13; G06F 30/39; G06F 3/0482; G06F 40/106; G06F 40/14; G06F 40/186; G06F 11/1076; G06F 12/00; G06F 12/023; G06F 12/0292; G06F 12/0607; G06F 12/0669; G06F 12/10; G06F 12/1009; G06F 12/1027; G06F 12/1408; G06F 12/1433; G06F 13/16; G06F 13/1689; G06F 16/11; G06F 16/586; G06F 16/84; G06F 16/88; G06F 16/958; G06F 19/321; G06F 21/00; G06F 21/125; G06F 21/14; G06F 21/45; G06F 21/50; G06F 21/51; G06F 21/552; G06F 21/6227; G06F 21/64; G06F 21/73; G06F 21/84; G06F 2203/014; G06F 2203/0383; G06F 2203/04803; G06F 2209/5011; G06F 2212/1016; G06F 2212/206; G06F 2212/2532; G06F 2221/033; G06F 3/016; G06F 3/0236; G06F 3/0362; G06F 3/044; G06F 3/0481; G06F 3/0483; G06F 3/0484; G06F 3/04842; G06F 3/04847; G06F 3/0485; G06F 3/04883; G06F 3/0604; G06F 3/0608; G06F 3/061; G06F 3/0619; G06F 3/0631; G06F 3/064; G06F 3/0641; G06F 3/0659; G06F 3/0665; G06F 3/067; G06F 3/0682; G06F 3/0683; G06F 3/14; G06F 40/103; G06F 40/109; G06F 40/117; G06F 40/12; G06F 40/143; G06F 40/151; G06F 7/588; G06F 8/41; G06F 9/451; G06F 9/5083

See application file for complete search history.

(56) References Cited

U.S. PATENT DOCUMENTS

| | | | |
|---|---|---|---|
| 5,574,482 A | 11/1996 | Niemeier | |
| 5,847,697 A | 12/1998 | Sugimoto | |
| 6,441,808 B1 | 8/2002 | Hashimoto | |
| 8,392,846 B2 | 3/2013 | Carapelli | |
| 8,643,617 B2 | 2/2014 | Kim et al. | |
| 9,214,051 B1 | 12/2015 | Newman | |
| 9,268,364 B2* | 2/2016 | Parker | G06F 1/1632 |
| 9,754,126 B2 | 9/2017 | Gellas | |
| 2003/0182558 A1 | 9/2003 | Lazzaro et al. | |
| 2005/0172137 A1 | 8/2005 | Hopkins | |
| 2005/0193208 A1* | 9/2005 | Charrette, III | G07F 7/1033 713/182 |
| 2006/0021024 A1 | 1/2006 | Park | |
| 2006/0053301 A1 | 3/2006 | Shin | |
| 2006/0110203 A1 | 5/2006 | Grafton | |
| 2006/0132447 A1* | 6/2006 | Conrad | G06F 3/03543 345/168 |
| 2006/0224523 A1 | 10/2006 | Elvitigala et al. | |
| 2007/0174615 A1 | 7/2007 | Ballou et al. | |
| 2008/0091944 A1 | 4/2008 | Mueller et al. | |
| 2008/0148186 A1 | 6/2008 | Krishnamurthy | |
| 2008/0189214 A1 | 8/2008 | Mueller et al. | |
| 2008/0224897 A1 | 9/2008 | Silva | |
| 2010/0064212 A1* | 3/2010 | Snyder | G06F 3/0488 715/700 |
| 2011/0102328 A1* | 5/2011 | Chen | G06F 1/1618 345/169 |
| 2011/0260982 A1* | 10/2011 | Trout | G06F 3/0489 345/169 |
| 2012/0047564 A1 | 2/2012 | Liu | |
| 2012/0104090 A1 | 5/2012 | Gross | |
| 2012/0235921 A1* | 9/2012 | Laubach | G06F 3/04895 345/172 |
| 2012/0268393 A1 | 10/2012 | Lee | |
| 2012/0280923 A1 | 11/2012 | Vincent et al. | |
| 2012/0323788 A1 | 12/2012 | Keresman, III et al. | |
| 2013/0086389 A1 | 4/2013 | Suwald | |
| 2013/0127725 A1 | 5/2013 | Sugimoto | |
| 2013/0182015 A1 | 7/2013 | Kuo et al. | |
| 2013/0234942 A1* | 9/2013 | Yoo | G06F 1/1673 345/168 |
| 2013/0333011 A1 | 12/2013 | Quigley et al. | |
| 2014/0078535 A1 | 3/2014 | Okada et al. | |
| 2014/0098141 A1 | 4/2014 | Sen et al. | |
| 2014/0324708 A1 | 10/2014 | McCauley et al. | |
| 2015/0109207 A1 | 4/2015 | Li et al. | |
| 2015/0235024 A1* | 8/2015 | Corrion | G06F 3/04845 726/18 |
| 2015/0310199 A1 | 10/2015 | Patel | |
| 2016/0065562 A1 | 3/2016 | Guo | |
| 2016/0094737 A1 | 3/2016 | Sugiura et al. | |
| 2016/0234625 A1 | 8/2016 | Wang | |
| 2016/0306958 A1 | 10/2016 | Dow et al. | |
| 2017/0235962 A1 | 8/2017 | Clark | |

FOREIGN PATENT DOCUMENTS

| | | |
|---|---|---|
| CN | 103425944 A | 12/2013 |
| CN | 106709382 A | 5/2017 |
| CN | 106980801 A | 7/2017 |
| CN | 106991306 A | 7/2017 |

\* cited by examiner

|  | 309-4 | 309-3 | 309-2 | 309-1 |  |
|---|---|---|---|---|---|
| 314-1 | 1 | 4 | 7 |  | 411-2 |
| 314-2 | 2 | 5 | 8 | 0 | 411-1 |
| 314-3 | 3 | 6 | 9 |  | 411-0 |

FIG. 7B

SYSTEM AND METHOD FOR A KEYPAD ON A TOUCH SCREEN DEVICE

CROSS-REFERENCE TO RELATED APPLICATIONS

This application is a Continuation of U.S. patent application Ser. No. 16/166,353, filed Oct. 22, 2018, entitled SYSTEM AND METHOD FOR A KEYPAD ON A TOUCH SCREEN DEVICE, which claims benefit of U.S. Provisional Application No. 62/576,401, filed Oct. 24, 2017, entitled SYSTEM AND METHOD FOR A KEYPAD ON A TOUCH SCREEN DEVICE, the specification of which is incorporated by reference herein in its entirety.

TECHNICAL FIELD

The present disclosure is related to keypads for mobile devices.

BACKGROUND

Touch and swipe-based key input functionalities are commonly used in devices with touchscreens. This includes, for example, the keyboards and keypads used in devices with touchscreens such as smartphones, tablets and laptops.

One of most important uses of these functionalities is the authentication of the user and verification of the identity using a numeric passcode or password. In many systems, the authentication is performed using a 4 to 12 digit numeric passcode or password called a Personal Identification Number (PIN).

For payment and other banking cards, the Personal Identification Number (PIN) is the most sensitive piece of information used for authentication. There are Payment Card Industry (PCI) regulations or other industrial standards that govern how the PIN should be handled by a terminal that accepts a PIN. In the past, PINs were entered by specially designed PIN-entry devices (PEDs). These PIN entry devices are tamper-resistant, and because of the stringent security requirements, are usually very expensive.

Accepting PIN entry by using software running on mobile devices and by using the keys or touchscreens on the mobile devices are inherently insecure because of malwares, Trojan horses or hacked operating systems. It is possible for keyloggers and screen capturers to capture the user input and then send it to hackers and attackers. Illegal capture of input data can be achieved by monitoring the coordinates of user interactions with the touchscreen of the device either electrically or through software means.

Another possible technique is via "smudge attacks", that is, systems where the attackers capture user input via observation of smudge patterns on the touchscreen of a mobile device. Smudge attacks rely on detecting the oily smudges left behind by the user's fingers when interacting with the touchscreen of the device using simple cameras and image processing software. Under proper lighting and camera settings, the finger smudges can be easily detected, and the heaviest smudges can be used to infer PINs. Such techniques can be highly effective as explained in, for example, Aviv, Adam J.; Gibson, Katherine; Mossop, Evan; Blaze, Matt; Smith, Jonathan M. Smudge Attacks on Smartphone Touchscreens (PDF). 4th USENIX Workshop on Offensive Technologies (WOOT), 10, pp. 1-7.

One of the challenges in the design of a mobile device with a touchscreen is determining how to allow a mobile phone to accept a PIN securely. Therefore, there is a need for a system and a method for secure and yet convenient PIN entry.

Some implementations have been proposed to try to tackle this issue. For example, some EFTPOS terminals have implemented keypads for entry of Personal Identification Numbers (PINs) with randomized button layout. Examples are provided in, for example US Patent Application Publication Number 2014/0164782 to Lo et al, filed Dec. 9, 2013 and published on Jun. 12, 2014. These systems do increase the difficulty of guessing the user pressed buttons solely from monitoring the coordinates of touchscreen input. This technique therefore can effectively prevent hackers, attackers and keyloggers obtaining a user input such as a PIN from a touch panel using, for example, keystroke capturers.

However, randomized PIN keypads which completely alter the locations of buttons relative to one another can cause difficulty of usage for some card holders, and involves a steep learning curve for most users.

Therefore, there is a need for randomization of keypad display parameters where at least some of the positional relationships are maintained.

SUMMARY

A system for randomization of one or more display parameters for a keypad displayed on a touchscreen of a mobile device, said system comprising a randomization subsystem to randomly select one or more variables related to at least one of said one or more display parameters, said one or more display parameters comprising a location of the keypad relative to said edge of said touchscreen, a size of said keypad, one or more sizes of one or more buttons within said keypad, and one or more positions of one or more groups of the one or more buttons within said keypad.

A method for randomization of one or more display parameters for a keypad displayed on a touchscreen of a mobile device, said method comprising randomly selecting one or more variables related to at least one of said one or more display parameters, said one or more display parameters comprising a location of the keypad relative to said edge of said touchscreen, a size of said keypad, one or more sizes of one or more buttons within said keypad, and one or more positions of one or more groups of the one or more buttons within said keypad.

BRIEF DESCRIPTION OF THE DRAWINGS

For a more complete understanding, reference is now made to the following description taken in conjunction with the accompanying Drawings in which:

Figure 4:
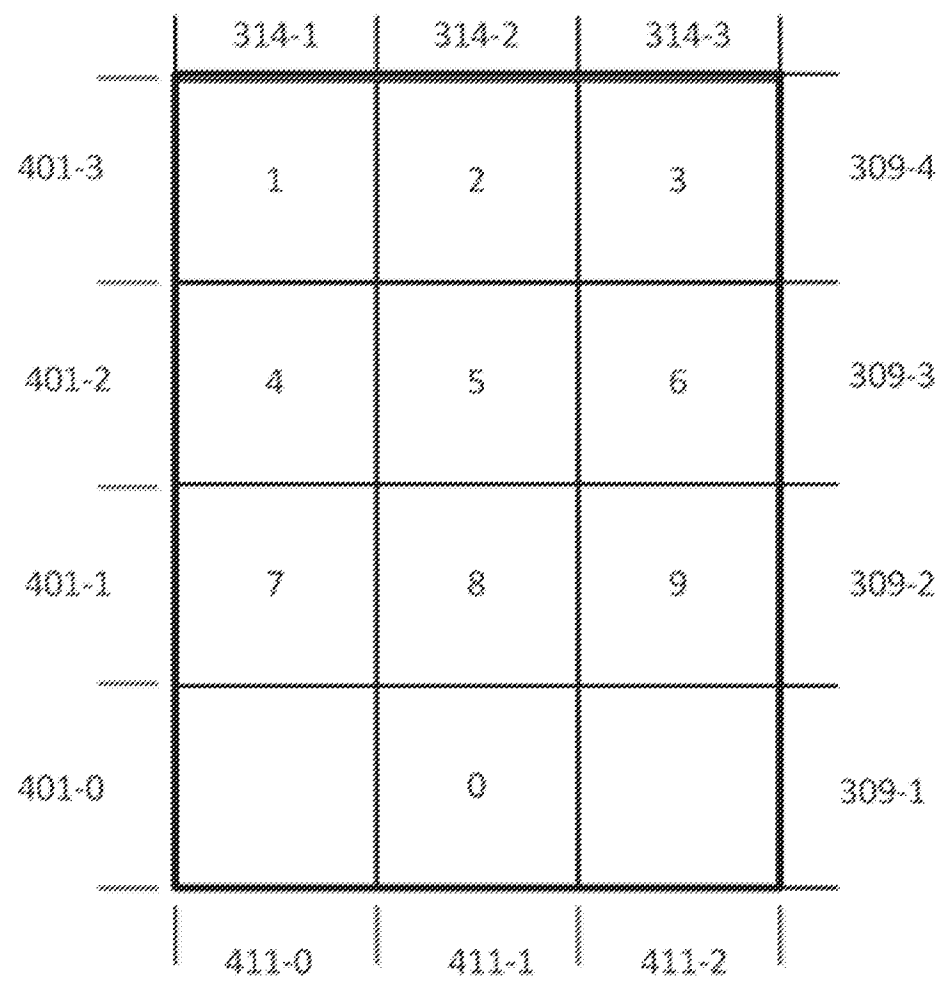

FIG. 4 illustrates a starting position for a keypad;

FIG. 5 illustrates an example of rolling up the rows of the keypad;

FIG. 6 illustrates an example of flipping the columns of the keypad;

FIG. 7A illustrates an example of horizontal mirroring;

FIG. 7B illustrates an example of vertical mirroring;

DETAILED DESCRIPTION

Figure 1:
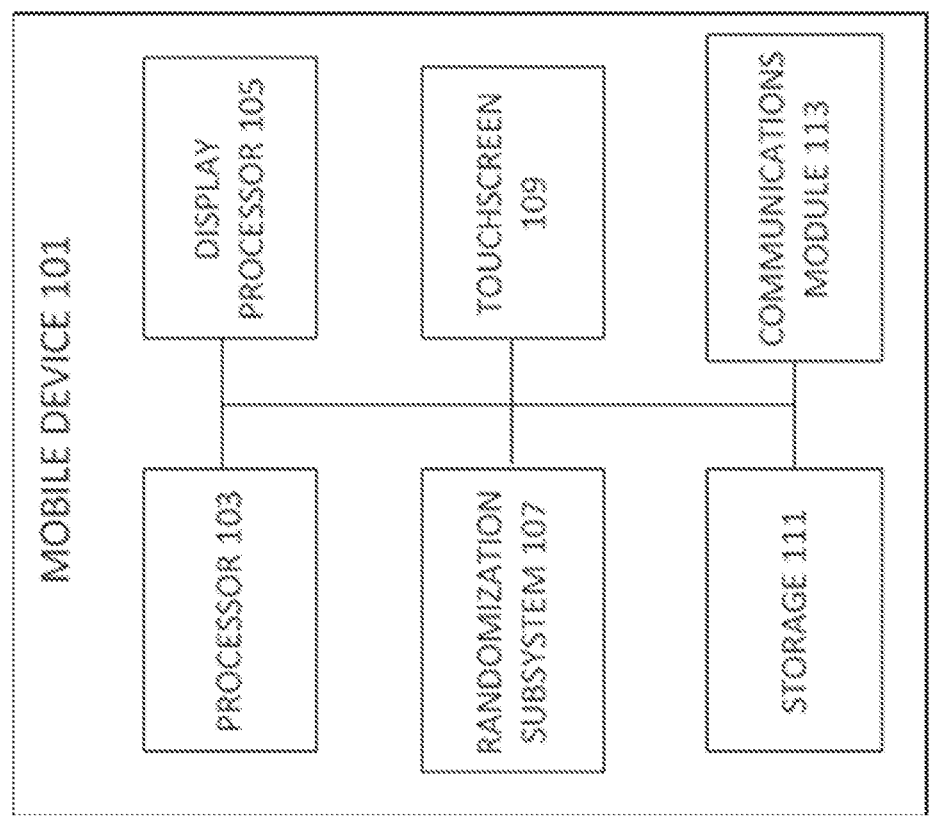
FIG. 1 illustrates an example embodiment of a mobile device.

Referring now to the drawings, wherein like reference numbers are used herein to designate like elements throughout, the various views and embodiments of system and method for a keypad on a touchscreen device are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

A system and method to implement randomization of keypad display parameters while maintaining at least some of the positional relationships between buttons are described below. This serves to increase the difficulty faced by an attacker in obtaining user inputs such as PINs from a touch panel, while reducing some of the difficulties faced by users in utilizing a keypad with randomized button layout. These parameters can be randomized either individually, or in combination.

Examples of display parameters which may be randomly selected include:

Location of the keypad relative to a corner,
Size of the keypad,
Size of the buttons, and
Positions of groups of buttons.

For each of these display parameters, there are one or more related variables which are randomly selected. Detailed examples are provided below.

FIG. 1 shows a mobile device 101. This is, for example, a smartphone or a tablet. Mobile device 101 has processor 103, display processor 105, randomization subsystem 107, touchscreen 109, storage 111 and communications module 113. These components of mobile device 101 are interconnected communicatively as shown in FIG. 1. These components are powered by, for example, a battery.

Processor 103 performs the processing operations used for the functioning of mobile device 101. Display processor 105 performs the operations used to generate displays on touchscreen 109. Touchscreen 109 displays graphics and other data for the user of the mobile device 101, and also allowed the user of mobile device 101 to interact with one or more elements within touchscreen 109. These elements include, for example, a keypad. Storage 111 stores data and programs used for the operation of mobile device 101. Communications module 113 handles communications between mobile device 101 and other devices and or networks.

Randomization subsystem 107 performs the function of randomly selecting values for one or more variables related to at least one of said one or more display parameters. Randomization subsystem 107 can be implemented in a variety of ways. In one embodiment, randomization subsystem 107 is implemented in hardware. In another embodiment, randomization subsystem 107 is implemented in software. In a further embodiment, randomization subsystem 107 is implemented using a combination of hardware and software. Randomization subsystem 107 performs the random selections detailed below using one or more probability distributions. Examples of probability distributions which are used are, for example, the uniform distribution and the Gaussian distribution.

Figure 2:
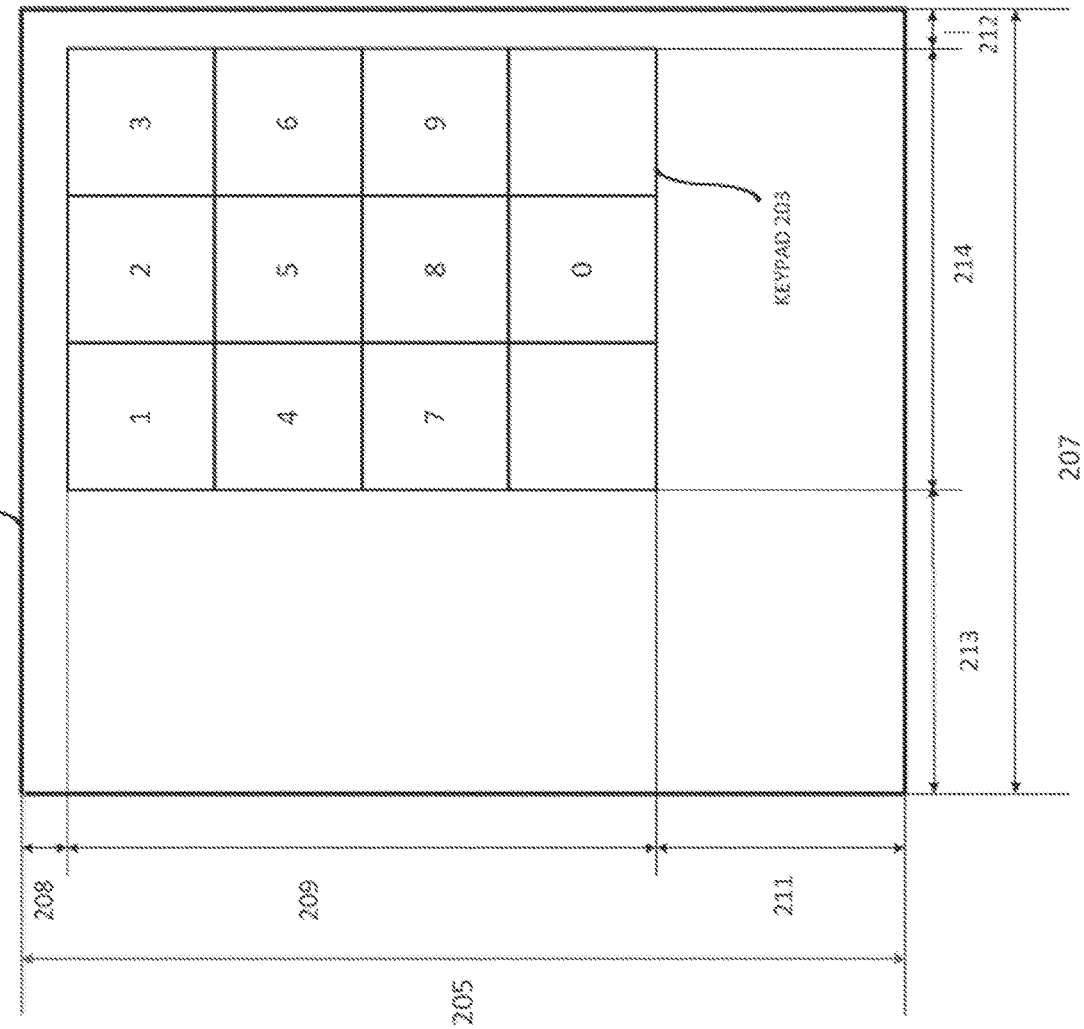
FIG. 2 illustrates a keypad displayed within a touchscreen of a mobile device.

FIG. 2 shows a keypad 203 displayed within touchscreen 109. In FIG. 2, touchscreen 109 has a width 207 in the horizontal or x-direction; and a height 205 in the vertical or y-direction. Keypad 203 has a width 214 in the x-direction and a height 209 in the y-direction. There is an x-direction gap 212 between the vertical edge of the touchscreen and the vertical edge of the keypad, such that keypad width 214 is less than touchscreen width 207. Similarly there is a y-direction gap 208 between the horizontal edge of the touchscreen and the horizontal edge of the keypad, such that keypad height 209 is less than touchscreen height 205.

In some embodiments, randomization subsystem 107 randomly selects only the location of the keypad relative to a corner of the touchscreen. Examples are shown below. In these embodiments, keypad width 214 and keypad height 209 are fixed.

The location of the bottom left corner of the keypad relative to the bottom left corner of touchscreen 109 is given by the variables of (x,y) co-ordinates (213,211). The range of possible values of the location x-co-ordinate 213 is calculated based on the touchscreen width 207 and the keypad width 214. Similarly, the range of possible values of the location y-co-ordinate 211 is calculated based on the touchscreen height 205 and the keypad height 209.

In some embodiments, these calculations take into account the need for gaps between the vertical edges of the touchscreen 109 and keypad 203; and between the horizontal edges of the touchscreen 109 and keypad 203. Examples are demonstrated below:

The maximum value of the location x-co-ordinate 213 is calculated based on the touchscreen width 207 and the keypad width 214. In some embodiments, this takes into account any x-direction gaps. For example, in one embodiment, the maximum value of the location x-co-ordinate 213 given by the difference between touchscreen width 207 and keypad width 214 and an x-direction gap 212 between the right edge of the touchscreen 109 and keypad 203. That is:

Maximum value of location x-co-ordinate 213=
(touchscreen width 207)−(keypad width 214+x-direction gap 212)

While only one x-direction gap between the right edges of the touchscreen 109 and keypad 203 is shown in FIG. 2, one of skill in the art would know that this is one example embodiment. In another embodiment, there is a second x-direction gap between the left edges of the touchscreen 109 and keypad 203.

Similarly, the maximum value of the location y-co-ordinate 211 is calculated based on the touchscreen height 205 and the keypad height 209. In some embodiments, this takes into account any y-direction gaps. For example, in one embodiment, the maximum value of the location y-co-ordinate 211 given by the difference between touchscreen height 205 and keypad height 209 and a y-direction gap 208 between the upper edges of the touchscreen 109 and keypad 203. That is:

Maximum value of location y-co-ordinate 211=
(touchscreen height 205)−(keypad height 209+y-direction gap 208)

While only one y-direction gap between the upper edges of the touchscreen 109 and keypad 203 is shown in FIG. 2, one of skill in the art would know that this is one example embodiment. In another embodiment, there is a second y-direction gap between the bottom edges of the touchscreen 109 and keypad 203.

Then, in the embodiment corresponding to a single x-direction gap, the location x-co-ordinate 213 is selected randomly from the range [0, (touchscreen width 207)–(keypad width 214+x-direction gap 212)]. Similarly, in the embodiment corresponding to a single y-direction gap, location y-co-ordinate 211 is selected randomly from the range [0, (touchscreen height 205)–(keypad height 209+y-direction gap 208)].

In the embodiment corresponding to two x-direction gaps, the location x-co-ordinate 213 is selected randomly from the range [x-direction gap 212, (touchscreen width 207)–(keypad width 214+x-direction gap 212)]. Similarly, in the embodiment corresponding to two y-direction gaps, location y-co-ordinate 211 is selected randomly from the range [y-direction gap 208, (touchscreen height 205)–(keypad height 209+y-direction gap 208)].

These variables are randomly selected by randomization subsystem 107 based on one or more probability distributions such as the uniform distribution or the Gaussian distribution as explained above.

In this way, the location of the keypad (213,211) is randomly distributed. Therefore the locations of each of the buttons are not fixed in time as well. This makes it difficult for an attacker to guess the coordinates of user interactions with keypad 203 on touchscreen 109.

In some embodiments, randomization subsystem 107 only randomly selects the size of the keypad, that is, only the variables of keypad width 214 and keypad height 209 are randomly selected. In some embodiments, the ranges of available keypad widths and keypad heights take into account any requirements for gaps between the keypad and touchscreen edges. Examples are demonstrated below for a case where there are two x-direction gaps and two y-direction gaps.

With reference to FIG. 2, in one embodiment, the keypad width 214 is randomly selected from the range [Xkeymin, (touchscreen width 207)–2× (x-direction gap 212)], where Xkeymin is the minimum length of the keyboard in the x-direction. The keypad height 209 is randomly selected from the range [Ykeymin, touchscreen height 205–2×(y-direction gap 208)], where Ykeymin is the minimum height of the keyboard in the y-direction. Then the location co-ordinates (213,211) are calculated taking into account the randomly selected touchscreen width and height.

Location x-coordinate 213=touchscreen width 207–keypad width 214

Location y-coordinate 211=touchscreen height 205–keypad height 209

In some embodiments, randomization subsystem 107 only randomly selects the size of the buttons in the keypad. That is, keypad width 214, keypad height 209, the location x-co-ordinate 213 and y-co-ordinate 211 are all fixed. At least one of the heights and widths of the buttons within the keypad are randomly selected.

This is demonstrated further below. FIG. 3 illustrates a further detailed description of keypad 203. Keypad 203 comprises columns 314-1, 314-2 and 314-3; and rows 309-1, 309-2, 309-3 and 309-4. In this example, each button within keypad 203 is referenced by [row, column] notation. For example, the button containing the number "1" is button [309-4, 314-1].

The width of columns 314-1, 314-2 and 314-3 are given by 324-1, 324-2 and 324-3 respectively. The height of rows 309-1, 309-2, 309-3 and 309-4 are given by 319-1, 319-2, 319-3 and 319-4 respectively. Then the width of button [309-4, 314-1] is 324-1 and the height of button [309-4, 314-1] is given by 319-4.

Embodiments to randomly select at least one of button widths and button heights of keypad 203 are then presented below.

In one embodiment, the row heights 319-1, 319-2, 319-3 and 319-4 are fixed, and the width of each column is randomly selected. With reference to FIG. 3B, in step 3B-01 randomization subsystem 107 randomly selects column width 324-1 from the range [XBmin, (keypad width 214)–2× XBmin], where XBmin is the minimum width of the button in the horizontal (x) direction.

In step 3B-02, column width 324-2 is randomly selected by randomization subsystem 107 from the range [XBmin, (keypad width 214)–(324-1+XBmin)].

In step 3B-03, column width 324-3 is then set to [keypad width 214–(column width 324-1+column width 324-2)].

In another embodiment, the column widths are fixed, and the heights of each row are randomly selected. With reference to FIG. 3C, in step 3C-01, row height 319-1 is randomly selected by randomization subsystem 107 from the range [YBmin, keypad height 209–3×YBmin], where YBmin is the minimum height of the button in the vertical (y) direction.

In step 3C-02, row height 319-2 is randomly selected by randomization subsystem 107 from the range [YBmin, keypad height 209–(row height 319-1+2×YBmin)].

In step 3C-03, row height 319-3 is randomly selected by randomization subsystem 107 from the range [YBmin, keypad height 209–(row height 319-1+row height 319-2+YBmin)].

In step 3C-04, row height 319-4 is then set to keypad height 209–(row height 319-1+row height 319-2+row height 319-3).

In yet another embodiment, both row heights and column widths are randomly selected. This is a combination of the steps in FIGS. 3B and 3C.

In one embodiment, this is performed in series. With reference to FIG. 3D, steps 3D-01 to 3D-03 are identical to steps 3B-01 to 3B-03 of FIG. 3B. Steps 3D-04 to 3D-07 are identical to steps 3C-01 to 3C-04 of FIG. 3C.

Figure 3A:
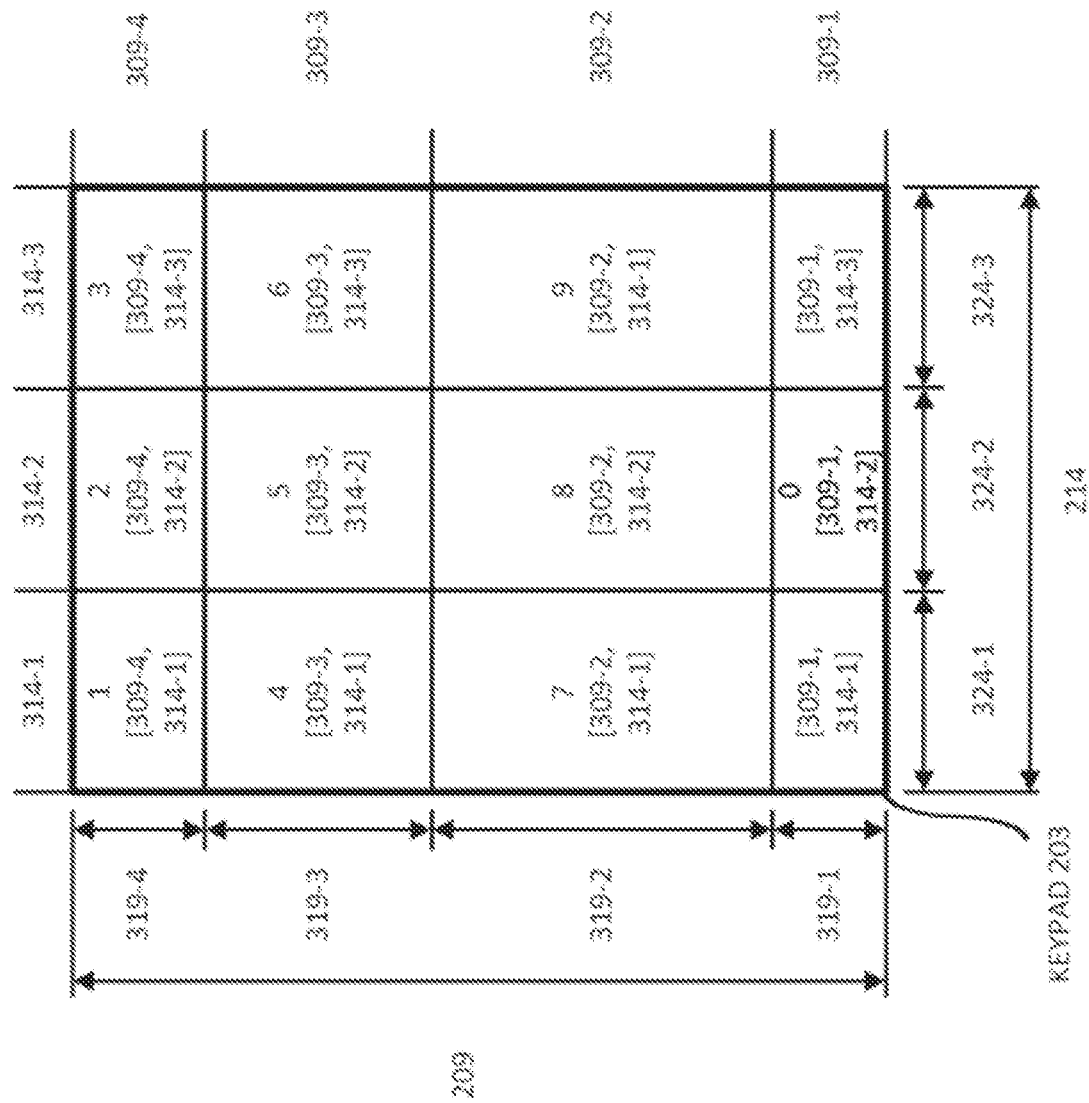
FIG. 3A illustrates a detailed description of a keypad.
Figure 3B:
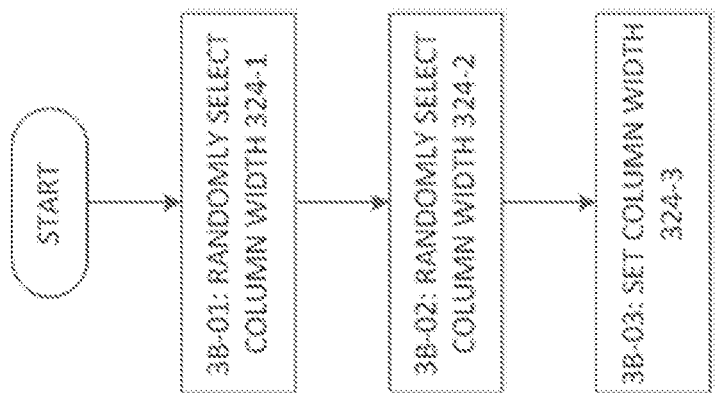
FIG. 3B illustrates a flowchart for randomly selecting button widths while button heights remain fixed.
Figure 3C:
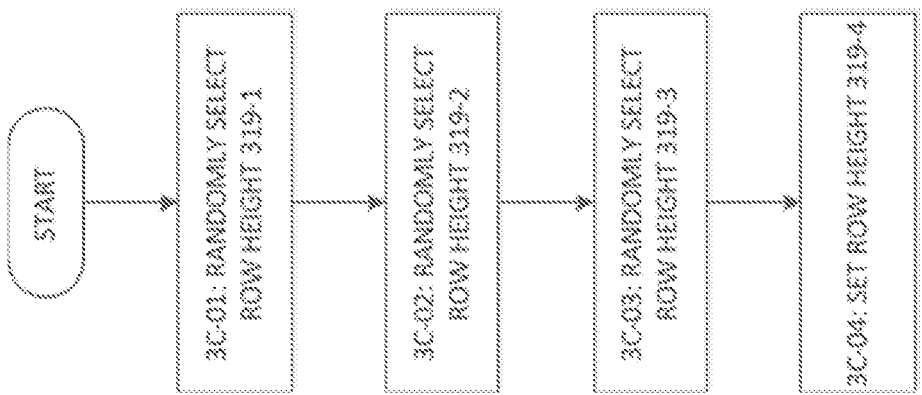
FIG. 3C illustrates a flowchart for randomly selecting button heights while button widths remain fixed.
Figure 3D:
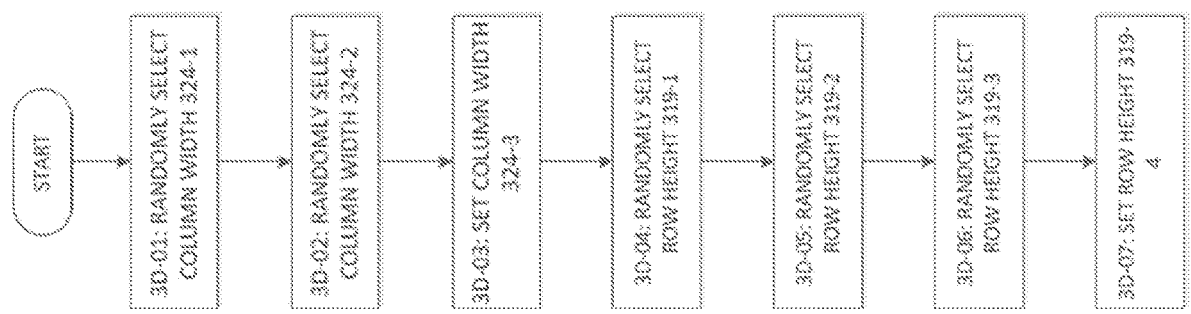
FIG. 3D illustrates a flowchart for randomly selecting button heights and button widths in series.
Figure 3E:
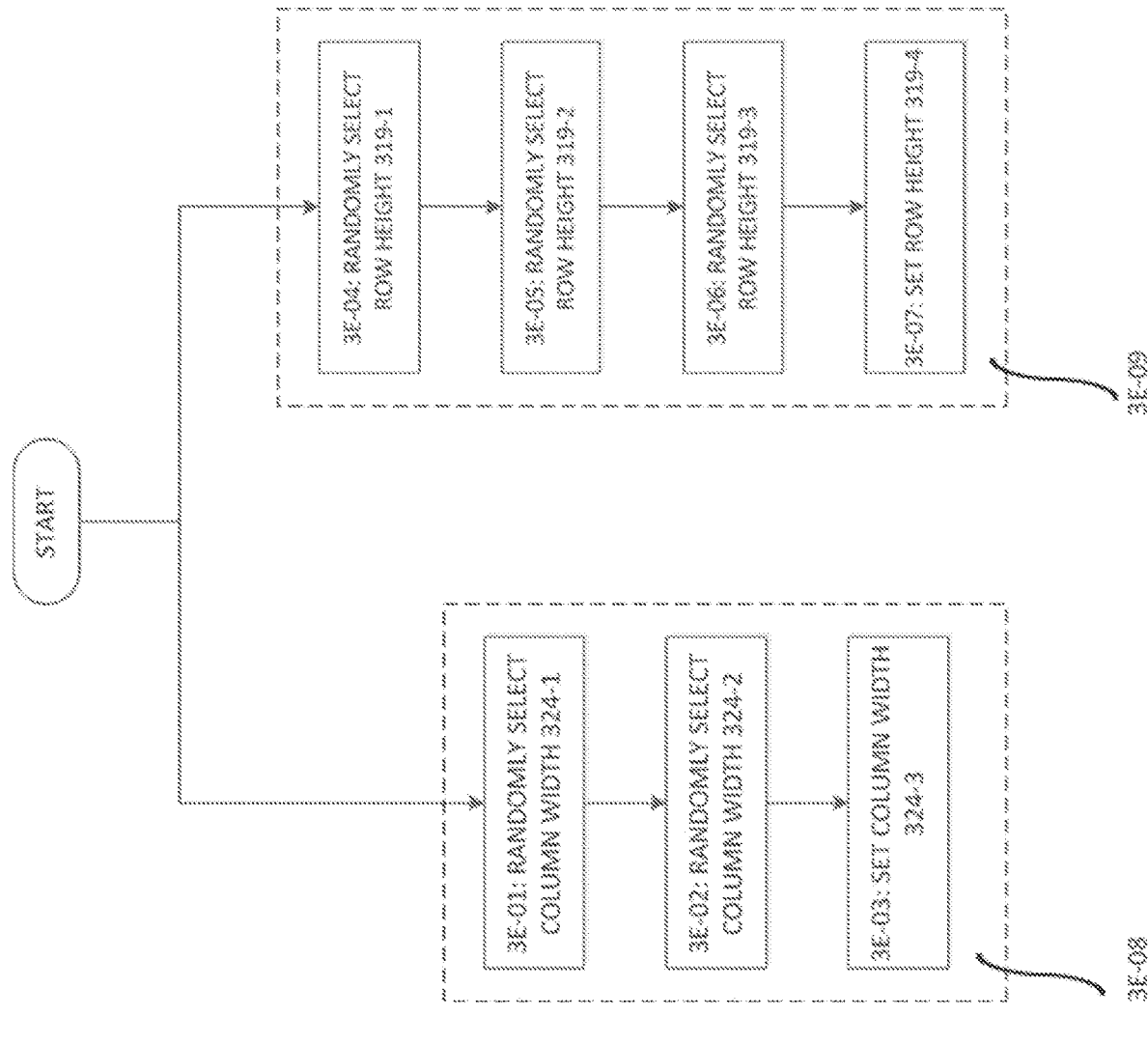
FIG. 3E illustrates a flowchart for randomly selecting button heights and button widths in parallel.

In another embodiment, this is performed in parallel as shown in FIG. 3E. In FIG. 3E branch 3E-08 comprises steps 3E-01 to 3E-03, which are identical to steps 3D-01 to 3D-03 of FIG. 3D. Branch 3E-09 comprises the steps 3E-04 to 3E-07, which are identical to steps 3D-04 to 3D-07 of FIG. 3D. The steps of branches 3E-08 and 3E-09 are performed in parallel by randomization subsystem 107 to improve processing speed.

In some embodiments, one or more positions of groups of buttons are randomly selected by randomization subsystem 107. Examples of such groups are the rows and columns on the keypad. By random selecting the positions of groups of buttons, at least some of the positional relationships within the group are still maintained. For example, when the position of a row of buttons is changed, the horizontal relationships among the buttons within the row are still maintained. This is likely to reduce the difficulty faced by the user when compared to the case of complete randomization of button layout, where both horizontal and vertical relationships may be completely changed.

As would be appreciated by one of skill in the art, in a keypad such as that shown in FIG. 3A, there are 4!=24 possible row arrangements and 3!=6 possible column arrangements. In one embodiment, one of these row arrangements or column arrangement are randomly selected. By doing so, it is possible to increase the difficulty faced by an attacker in determining the coordinates of touchscreen interactions by a user.

Another possibility is "rolling" up the rows by rollup parameter RP, which is an integer greater than or equal to 1. This involves moving each row up RP times and "wrapping around" when it reaches the top. An example is demonstrated below:

FIG. 4 shows the starting position for the keypad. The notation for the row references in FIG. 4 are 401-(row position). For example, the reference for row position 0 is denoted as 401-0; the reference for row position 1 is denoted as 401-1 and so on. The notation for the column references in FIG. 4 are 411-(column position). For example, the reference for column position 0 is denoted as 411-0, the reference for column position 1 is denoted as 411-1 and so on.

Initially
- row 309-1 is in row position 0, referenced as 401-0;
- row 309-2 is in row position 1, referenced as 401-1;
- row 309-3 is in row position 2, referenced as 401-2;
- row 309-4 is in row position 3, referenced as 401-3;
- column 314-1 is in column position 0, referenced as 411-0;
- column 314-2 is in column position 1, referenced as 411-1; and
- column 314-3 is in column position 2, referenced as 411-2.

Then RP is randomly selected from a range [1, 3]. The new row position is determined by New row position=(Starting row position+RP)(mod 4), where mod denotes the integer modulo operation.

Figure 5:
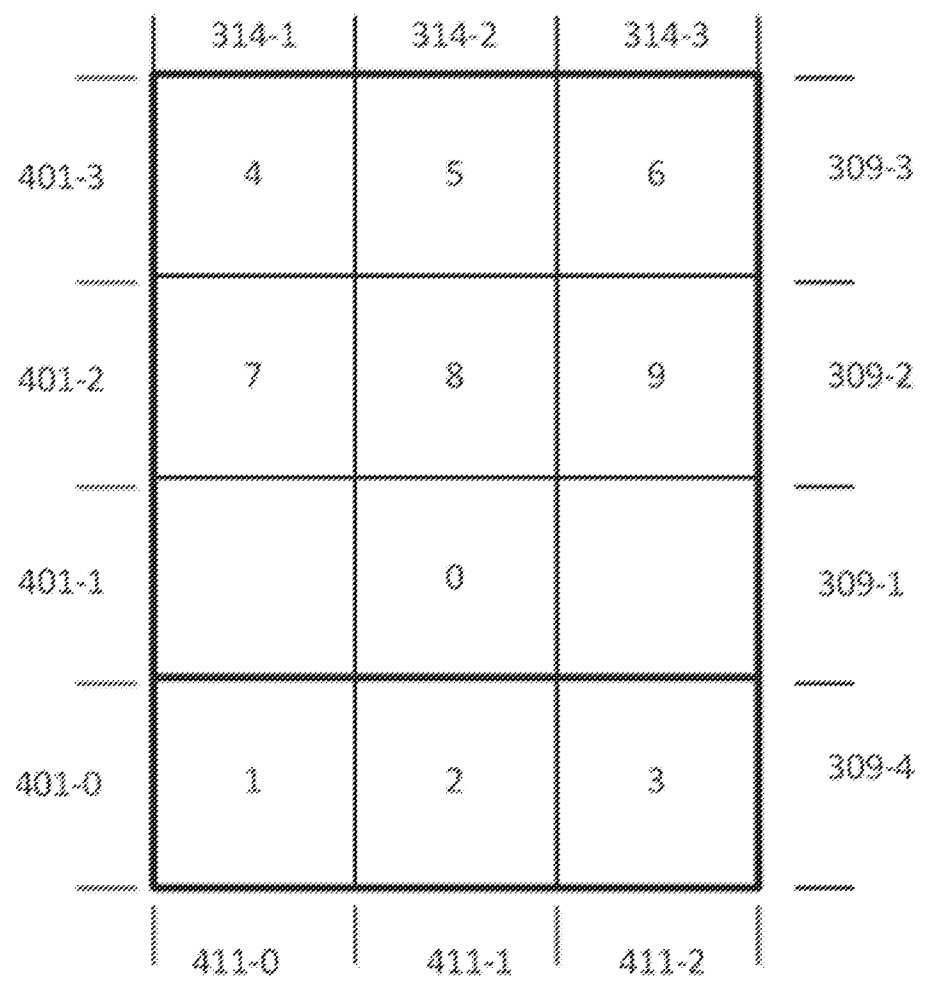

FIG. 5 shows an example where RP=1. In FIG. 5,
- New row position of 309-1=(0+1)(mod 4)=1, referenced by 401-1;
- New row position of 309-2=(1+1)(mod 4)=2, referenced by 401-2;
- New row position of 309-3=(2+1)(mod 4)=3, referenced by 401-3; and
- New row position of 309-4=(3+1)(mod 4)=0, referenced by 401-0.

A similar operation can be carried out for columns. This is denoted as "flipping" columns by flip parameter (FP) which is an integer greater than or equal to 1. Each column is moved rightwards FP times and "wrapped around" when it reaches the right edge.

FIG. 4 above shows the starting position for the keypad. FP is randomly selected from a range [1, 2]. The new column position is determined by:

New column position=(Starting column position+FP) (mod 3)

Figure 6:
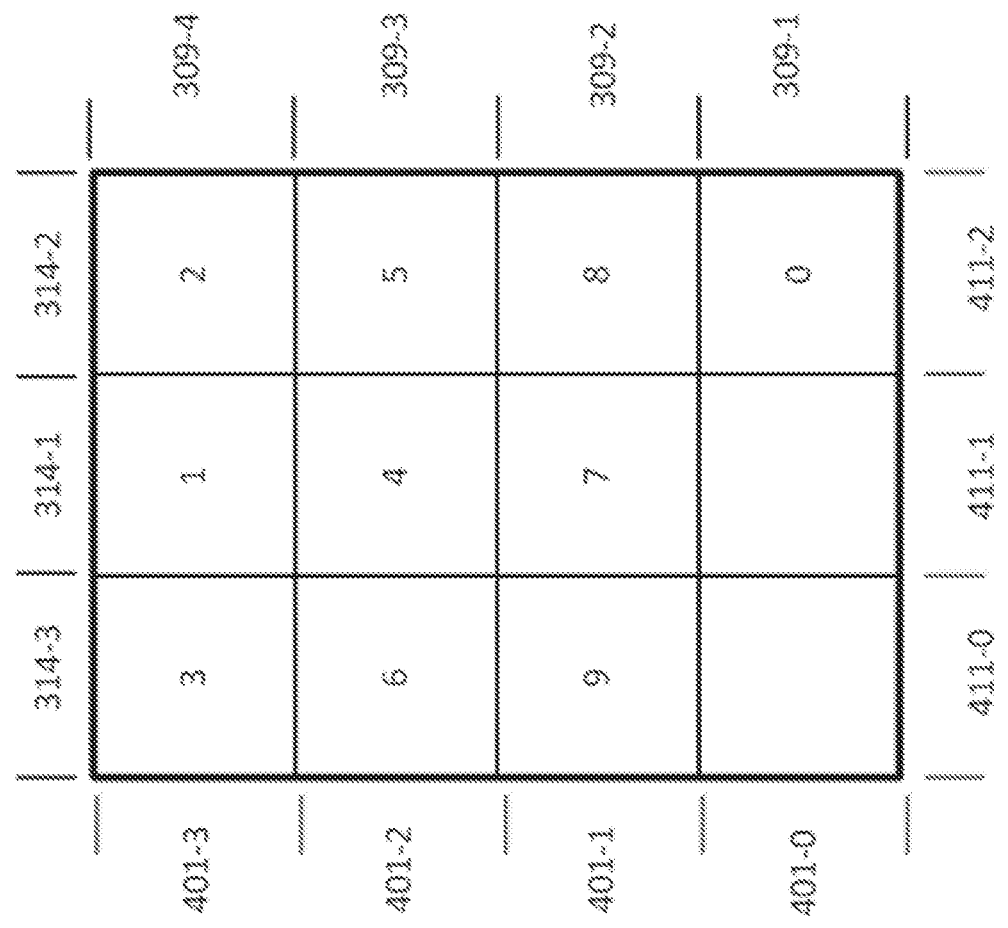

FIG. 6 shows an example where FP=1.
- New column position of 314-1=(0+1)(mod 3)=1, referenced by 411-1;
- New column position of 314-2=(1+1)(mod 3)=2, referenced by 411-2; and
- New column position of 314-3=(2+1)(mod 3)=0, referenced by 411-0;

Another possibility is randomly "mirroring" the button layout. A left to right mirror image of the starting position keypad in FIG. 4 is given in FIG. 7A. As can be seen in FIG. 7A, column 314-1 changes position to column position 411-2 and column position 314-3 changes position to column position 411-0. Then randomization subsystem 107 makes a random selection from either the starting position or the horizontal mirrored position.

Figure 7B:
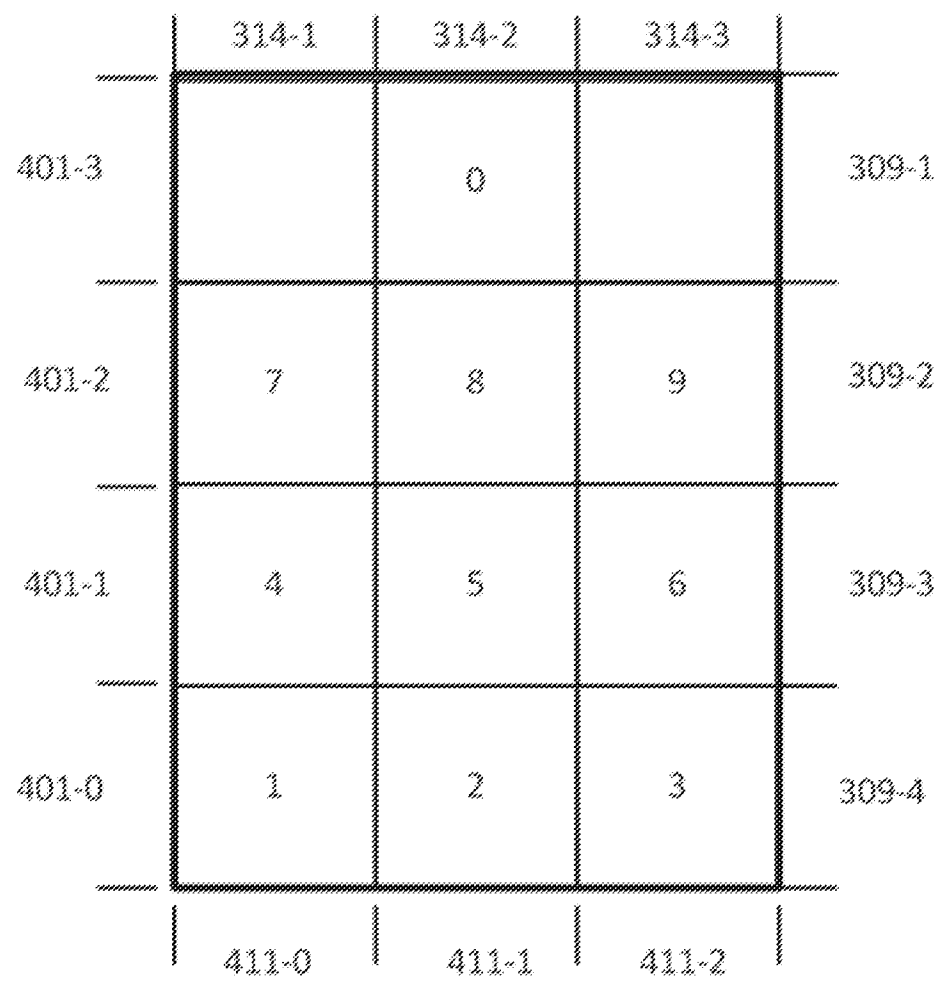

In other embodiments, a vertical mirroring is used as shown in FIG. 7B. In the vertical mirror image, the row positions of 309-1 and 309-4 in the starting position are interchanged, as are the row positions of 309-2 and 309-3. Then randomization subsystem 107 makes a random selection from either the starting position or the vertical mirrored position.

Figure 8:
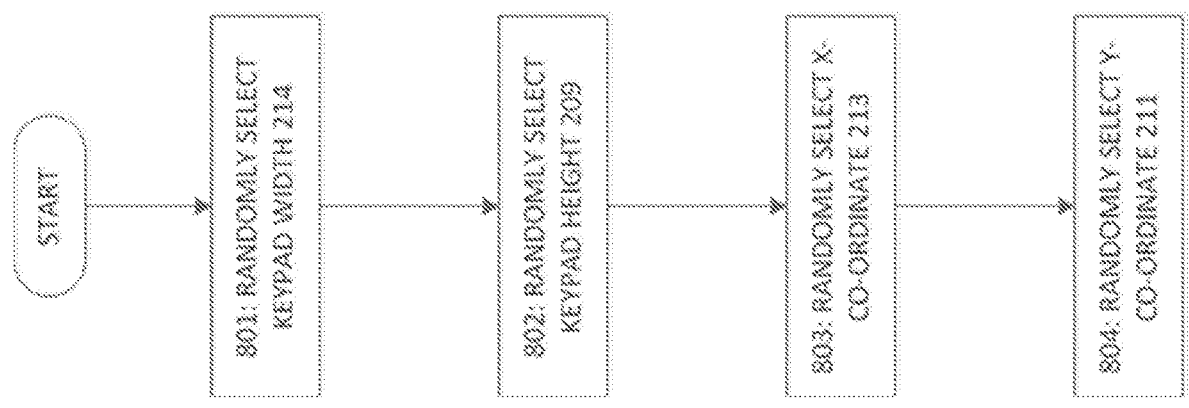
FIG. 8 illustrates an example of a random selection of a combination of two or more display parameters.

It is possible to randomly select two or more display parameters in combination. FIG. 8 illustrates one example of a random selection of a combination of location of the keypad relative to a corner; and size of the keypad. In step 801, keypad width 214 is selected randomly by randomization subsystem 107 from the range [Xkeymin, (touchscreen width 207−2×x-direction gap 212)]. Xkeymin represents a minimum width for the keypad.

In step 802, randomization subsystem 107 randomly selects keypad height 209 from the range [Ykeymin, (touchscreen height 205−2×y-direction gap 208)]. Ykeymin represents a minimum height for the keypad.

In step 803, randomization subsystem 107 randomly selects x-coordinate 213 from the range [0, (touchscreen width 207−keypad width 214)].

In step 804, randomization subsystem 107 randomly selects y-coordinate 211 from the range [0, (touchscreen height 205−keypad height 209)].

Figure 9:
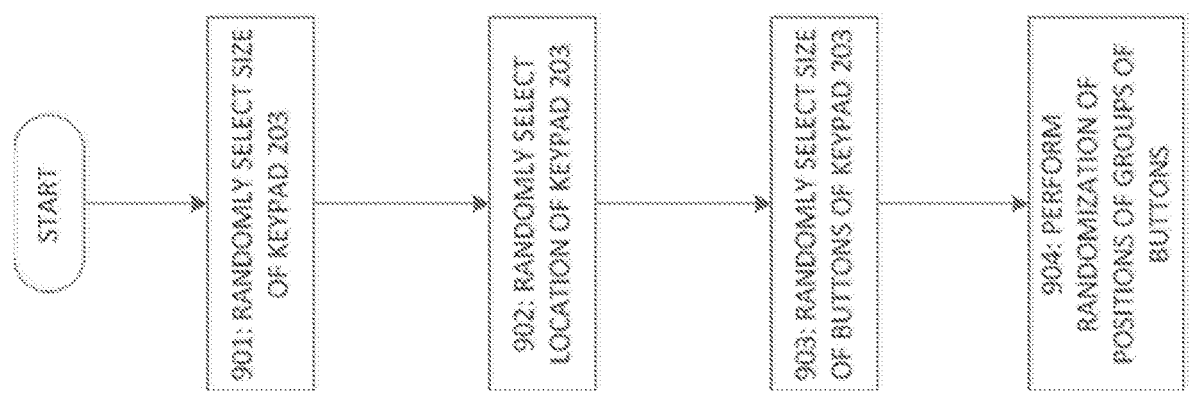
FIG. 9 illustrates an example of a sequence of random selections of a combination of display parameters are implemented.

In some embodiments, sequences of random selections of combinations of display parameters are implemented. For example a sequence for a combination of randomization of location of keypad, size of keypad, size of buttons and positions of groups of buttons is shown in FIG. 9. In step 901, randomization subsystem 107 randomly selects a size of the keypad 203 as described above. In step 902, randomization subsystem 107 randomly selects a location of the keypad 203 using the process described above. In step 903, randomization subsystem 107 randomly selects the size of the buttons of keypad 203 as described above. In step 904, randomization subsystem 107 randomly selects positions of groups of buttons as described above.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for display of a keypad on a mobile device, wherein the keypad comprises one or more groups of two or more buttons, the system comprising:
    a randomization subsystem to randomly select one or more variables related to the display of the keypad;
    the one or more groups comprises:
        a first and a second column, and
        a first and a second row; and the random selection of the one or more variables comprises one of:
   a random selection of either a starting position or a horizontal mirrored position for the keypad, wherein:
      the first column occupies a first column position when the starting position for the keypad is selected, and a second column position when the horizontal mirrored position for the keypad is selected,
      the second column occupies the second column position when the starting position for the keypad is selected, and the first column position when the horizontal mirrored position for the keypad is selected, and
   a random selection of either a starting position or a vertical mirrored position for the keypad, wherein:
      the first row occupies a first row position when the starting position for the keypad is selected, and a second row position when the vertical mirrored position for the keypad is selected; and
      the second row occupies the second row position when the starting position for the keypad is selected, and the first row position when the vertical mirrored position for the keypad is selected.

2. The system of claim 1, further wherein the random selection of the one or more variables comprises a random selection of either a flip parameter or a roll up parameter.

3. The system of claim 1, further wherein
   the keypad is displayed on a screen of the mobile device; and
   the random selection of the one or more variables comprises a random selection of a location of the keypad relative to a corner of the touchscreen.

4. The system of claim 3, wherein the random selection of the location of the keypad is based on at least one of a width and a height of the screen.

5. The system of claim 4, wherein the random selection of the location of the keypad is based on at least one of a horizontal gap and a vertical gap between the screen and the keypad.

6. The system of claim 1, wherein the randomization subsystem performs at least one random selection using one or more probability distributions.

7. The system of claim 6, wherein the one or more probability distributions comprise either a uniform distribution or a Gaussian distribution.

8. The system of claim 1, wherein the randomization subsystem further performs a random selection of a size of the keypad.

9. The system of claim 8, wherein the random selection of the size of the keypad is based on at least one of a horizontal gap and a vertical gap between the screen and the keypad.

10. The system of claim 1, wherein the randomization subsystem further performs a random selection of one or more sizes corresponding to one or more of the buttons.

11. The system of claim 1, wherein the randomization subsystem further performs a random sequence of random selections of two or more of: a size keypad, one or more sizes corresponding to one or more of the buttons, and a location of the keypad relative to a corner of the touchscreen.

12. The system of claim 1, wherein the randomization subsystem performs a random selection of at least one of
   a width of either the first column or the second column; and
   a height of either the first row or the second row.

13. A method for displaying a keypad on a mobile device, the keypad comprises one or more groups of two or more buttons, the one or more groups comprises a first and a second column, and a first and a second row, the method comprising:
   enabling a randomization subsystem to randomly select one or more variables related to the displaying of the keypad, wherein
   the random selection of the one or more variables comprises one of:
      a random selection of either a starting position or a horizontal mirrored position for the keypad, wherein:
         the first column occupies a first column position when the starting position for the keypad is selected, and a second column position when the horizontal mirrored position for the keypad is selected, and
         the second column occupies the second column position when the starting position for the keypad is selected, and the first column position when the horizontal mirrored position for the keypad is selected, and
      a random selection of either a starting position or a vertical mirrored position for the keypad, wherein:
         the first row occupies a first row position when the starting position for the keypad is selected, and a second row position when the vertical mirrored position for the keypad is selected, and
         the second row occupies the second row position when the starting position for the keypad is selected, and the first row position when the vertical mirrored position for the keypad is selected.

14. The method of claim 13, further wherein the random selection of the one or more variables comprises a random selection of either a flip parameter or a roll up parameter.

15. The method of claim 13, further wherein
   the keypad is displayed on a screen of the mobile device;
   the random selection of the one or more variables comprises a random selection of a location of the keypad relative to a corner of the touchscreen.

16. The method of claim 13, wherein the randomization subsystem performs a random selection of a size of the keypad.

17. The method of claim 16, wherein the random selection of the size of the keypad is based on at least one of a horizontal gap and a vertical gap between the screen and the keypad.

18. The method of claim 13, wherein the randomization subsystem further performs a random selection of one or more sizes corresponding to one or more of the buttons.

19. The method of claim 13, wherein the randomization subsystem further performs a random sequence of random selections of two or more of: a size keypad, one or more sizes corresponding to one or more of the buttons, and a location of the keypad relative to a corner of the touchscreen.

20. A non-transitory computer-readable storage medium, having instructions stored thereon, which when executed by a processing system of a mobile device causes the mobile device to perform operations for displaying a keypad on the mobile device, the keypad comprises one or more groups of two or more buttons, the one or more groups comprises a first and a second column, and a first and a second row, and the operations comprise:
   enabling a randomization subsystem to randomly select one or more variables related to the displaying of the keypad, wherein the random selection of the one or more variables comprises one of:
      a random selection of either a starting position or a horizontal mirrored position for the keypad, wherein:

the first column occupies a first column position when the starting position for the keypad is selected, and a second column position when the horizontal mirrored position for the keypad is selected, and the second column occupies the second column position when the starting position for the keypad is selected, and the first column position when the horizontal mirrored position for the keypad is selected, and a random selection of either a starting position or a vertical mirrored position for the keypad, wherein:

the first row occupies a first row position when the starting position for the keypad is selected, and a second row position when the vertical mirrored position for the keypad is selected, and the second row occupies the second row position when the starting position for the keypad is selected, and the first row position when the vertical mirrored position for the keypad is selected.

\* \* \* \* \*